United States Patent
Park

(10) Patent No.: US 7,291,085 B2
(45) Date of Patent: Nov. 6, 2007

(54) SIX-SPEED POWERTRAIN OF AN AUTOMATIC TRANSMISSION

(75) Inventor: Jong Sool Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 180 days.

(21) Appl. No.: 11/219,066

(22) Filed: Sep. 1, 2005

(65) Prior Publication Data

US 2006/0046891 A1    Mar. 2, 2006

(30) Foreign Application Priority Data

Sep. 1, 2004    (KR) .................... 10-2004-0069541

(51) Int. Cl.
*F16H 3/44*    (2006.01)
(52) U.S. Cl. ...................................... 475/280
(58) Field of Classification Search ............... 475/280, 475/288, 295

See application file for complete search history.

(56) References Cited

U.S. PATENT DOCUMENTS 5,755,636 A    5/1998   Justice et al.

FOREIGN PATENT DOCUMENTS

| DE | 42 22 911 A1 | 9/1993 |
| DE | 102 50 371 A1 | 7/2003 |
| JP | 06-323381 | 11/1994 |
| JP | 199 12 480 A1 | 9/2000 |
| JP | 2002-130398 | 5/2002 |

*Primary Examiner*—Dirk Wright
(74) *Attorney, Agent, or Firm*—Morgan Lewis & Bockius LLP

(57) ABSTRACT

Durability and power transmission efficiency are enhanced in a six-speed powertrain of an automatic transmission by a scheme that includes: a first planetary gear set having operational elements of a first sun gear, a first ring gear, and a first carrier; a second planetary gear set having operational elements of a second sun gear, a second ring gear, and a second carrier; a third planetary gear set having operational elements of a third sun gear, a third ring gear, and a third carrier; an input shaft; at least one output gear; and a transmission case. The first sun gear is fixedly connected to the second sun gear. The second carrier is fixedly connected to the third ring gear. The third sun gear always acts as an input element by being fixedly connected to the input shaft. At lease one operational element of the third carrier and the first ring gear always acts as an output element by being fixedly connected to the at least one output gear. At least one of the fixedly connected first and second sun gears is variably connected to the input shaft via a first clutch. The first carrier is variably connected to the input shaft via a second clutch. The first carrier is variably connected to the transmission case via a first brake and is subject to a stopping operation of the first brake. At lease one of the fixedly connected first and second sun gears is variably connected to the transmission case via a second brake and is subject to a stopping operation of the second brake. The second ring gear is variably connected to the transmission case via a third brake and is subject to a stopping operation of the third brake.

6 Claims, 21 Drawing Sheets

FIG.2

| Speed | C1 | C2 | B1 | B2 | B3 | Shift ratio | Step ratio | |
|-------|----|----|----|----|----|-------------|------------|---|
| D1    |    |    | O  |    | O  | 4.920       | 1.75       | |
| D2    |    |    |    | O  | O  | 2.810       | 1.60       | |
| D3    | O  |    |    |    | O  | 1.753       | 1.32       | D1/D6 = |
| D4    |    | O  |    |    | O  | 1.325       | 1.33       | 6.32 |
| D5    | O  | O  |    |    |    | 1.000       | 1.29       | |
| D6    |    | O  |    | O  |    | 0.778       |            | |
| R     | O  |    |    | O  |    | −3.500      | R/D1 = −0.71 | |

| $Z_{R1}/Z_{S1}=$ | 3.500 | SPPG |
|---|---|---|
| $Z_{R2}/Z_{S2}=$ | 3.000 | SPPG |
| $Z_{R3}/Z_{S3}=$ | 2.412 | SPPG |

FIG.11B

| Speed | Shift ratio |
|---|---|
| D1 | 4.920 |
| D2 | 2.810 |
| D3 | 1.753 |
| D4 | 1.325 |
| D5 | 1.000 |
| D6 | 0.778 |
| R1 | −3.500 |

FIG. 11C

Rotation speed of each element (relative to input element)

| Speed | S1 | PC1 | R1 | S2 | PC2 | R2 | S3 | PC3 | R3 | IN | OU | P1-PC1 | P2-PC2 | P3-PC3 |
|---|---|---|---|---|---|---|---|---|---|---|---|---|---|---|
| D1 | -0.711 | 0.000 | 0.203 | -0.711 | -0.178 | 0.000 | 1.000 | 0.167 | -0.178 | 1.000 | 0.203 | 0.569 | 0.534 | -1.179 |
| D2 | 0.000 | 0.277 | 0.356 | 0.000 | 0.000 | 0.000 | 1.000 | 0.293 | 0.000 | 1.000 | 0.356 | 0.221 | 0.000 | -1.001 |
| D3 | 1.000 | 0.666 | 0.571 | 1.000 | 0.250 | 0.000 | 1.000 | 0.470 | 0.250 | 1.000 | 0.571 | -0.267 | -0.750 | -0.751 |
| D4 | 1.858 | 1.000 | 0.755 | 1.858 | 0.465 | 0.000 | 1.000 | 0.622 | 0.465 | 1.000 | 0.755 | -0.687 | -1.394 | -0.537 |
| D5 | 1.000 | 1.000 | 1.000 | 1.000 | 0.750 | 0.667 | 1.000 | 0.824 | 0.750 | 1.000 | 1.000 | 0.000 | -0.249 | -0.250 |
| D6 | 0.000 | 1.000 | 1.286 | 0.000 | 1.083 | 1.444 | 1.000 | 1.059 | 1.083 | 1.000 | 1.286 | 0.800 | 1.083 | 0.083 |
| R1 | 1.000 | 0.000 | -0.286 | 1.000 | -0.747 | -1.330 | 1.000 | -0.235 | -0.747 | 1.000 | -0.286 | -0.800 | -1.748 | -1.750 |

FIG.11D

Slip speeds of non-operated friction elements (relative to input element)

| Speed | C-1 | C-2 | B-1 | B-2 | B-3 | SUM |
|---|---|---|---|---|---|---|
| D1 | 1.711 | 1.000 | 0.000 | 0.711 | 0.000 | 3.423 |
| D2 | 1.000 | 0.723 | 0.277 | 0.000 | 0.000 | 2.000 |
| D3 | 0.000 | 0.334 | 0.666 | 1.000 | 0.000 | 2.000 |
| D4 | 0.858 | 0.000 | 1.000 | 1.858 | 0.000 | 3.717 |
| D5 | 0.000 | 0.000 | 1.000 | 1.000 | 0.667 | 2.667 |
| D6 | 1.000 | 0.000 | 1.000 | 0.000 | 1.444 | 3.444 |
| R1 | 0.000 | 1.000 | 0.000 | 1.000 | 1.330 | 3.330 |
| SM | 4.570 | 3.057 | 3.943 | 5.570 | 3.441 | 20.581 |

FIG. 11E

Torque load (relative to input element)

| Speed | S1 | PC1 | R1 | S2 | PC2 | R2 | S3 | PC3 | R3 | TIN | TOUT | C-1 | C-2 | B-1 | B-2 | B-3 |
|---|---|---|---|---|---|---|---|---|---|---|---|---|---|---|---|---|
| D1 | -0.603 | 2.713 | -2.110 | 0.603 | -2.412 | 1.809 | 1.000 | -3.412 | 2.412 | 1.000 | -4.920 | 0.000 | 0.000 | 2.713 | 0.000 | 1.809 |
| D2 | 0.000 | 0.000 | 0.000 | 0.603 | -2.412 | 1.809 | 1.000 | -3.412 | 2.412 | 1.000 | -2.810 | 0.000 | 0.000 | 0.000 | 0.603 | 1.809 |
| D3 | 0.000 | 0.000 | 0.000 | 0.376 | -1.505 | 1.128 | 0.624 | -2.128 | 1.505 | 1.000 | -1.753 | 0.376 | 0.000 | 0.000 | 0.000 | 1.128 |
| D4 | -0.162 | 0.731 | -0.568 | 0.162 | -0.650 | 0.487 | 0.269 | -0.919 | 0.650 | 1.000 | -1.325 | 0.000 | 0.731 | 0.000 | 0.000 | 0.487 |
| D5 | -0.286 | 1.286 | -1.000 | 0.000 | 0.000 | 0.000 | 0.000 | 0.000 | 0.000 | 1.000 | -1.000 | -0.286 | 1.286 | 0.000 | 0.000 | 0.000 |
| D6 | -0.222 | 1.000 | -0.778 | 0.000 | 0.000 | 0.000 | 0.000 | 0.000 | 0.000 | 1.000 | -0.778 | 0.000 | 1.000 | 0.000 | -0.222 | 0.000 |
| R1 | 1.000 | -4.500 | 3.500 | 0.000 | 0.000 | 0.000 | 0.000 | 0.000 | 0.000 | 1.000 | 3.500 | 1.000 | 0.000 | -4.500 | 0.000 | 0.000 |

FIG.11F

Power transmission route

| Speed | Number of planetary gearsets | Power transmission |
|---|---|---|
| D1 | 3 | PG-PG2-PG3 |
| D2 | 1 | PG3 |
| D3 | 2 | PG2-PG3 |
| D4 | 3 | PG1-PG2-PG3 |
| D5 | 0 | |
| D6 | 1 | PG1 |
| R1 | 1 | PG1 |

|  | C1 | C2 | B1 | B2 | B3 | B4 |
|---|---|---|---|---|---|---|
| D1 |  |  | ○ |  |  | ○ |
| D2 | ○ |  | ○ |  |  |  |
| D3 |  | ○ | ○ |  |  |  |
| D4 | ○ | ○ |  |  |  |  |
| D5 |  | ○ |  |  |  | ○ |
| D6 |  | ○ |  |  | ○ |  |
| REV |  |  |  | ○ |  | ○ |

FIG. 14A

| | | |
|---|---|---|
| $Z_{R1}/Z_{S1}=$ | 2.198 | DPPG |
| $Z_{R2}/Z_{S2}=$ | 2.398 | SPPG |
| $Z_{R3}/Z_{S3}=$ | 1.902 | SPPG |

FIG. 14B

| Speed | Shift ratio |
|---|---|
| D1 | 3.967 |
| D2 | 2.162 |
| D3 | 1.417 |
| D4 | 1.000 |
| D5 | 0.797 |
| D6 | 0.641 |
| R1 | −3.278 |

FIG. 14C

Rotation speed of each element (relative to input element)

| Speed | S1 | PC1 | R1 | S2 | PC2 | R2 | S3 | PC3 | R3 | IN | OUT | P1-PC1 | P2-PC2 | P3-PC3 |
|---|---|---|---|---|---|---|---|---|---|---|---|---|---|---|
| D1 | 0.000 | 1.000 | 0.545 | 0.000 | 0.252 | 0.357 | 0.000 | 0.357 | 0.545 | 1.000 | 0.252 | 1.669 | 0.361 | 0.511 |
| D2 | 1.000 | 1.000 | 1.000 | 0.000 | 0.463 | 0.655 | 0.000 | 0.655 | 1.000 | 1.000 | 0.463 | 0.000 | 0.661 | 0.938 |
| D3 | 2.156 | 1.000 | 1.526 | 0.000 | 0.706 | 1.000 | 0.000 | 1.000 | 1.526 | 1.000 | 0.706 | -1.929 | 1.009 | 1.431 |
| D4 | 1.000 | 1.000 | 1.000 | 1.000 | 1.000 | 1.000 | 1.000 | 1.000 | 1.000 | 1.000 | 1.000 | 0.000 | 0.000 | 0.000 |
| D5 | 0.000 | 1.000 | 0.545 | 1.865 | 1.255 | 1.000 | 1.865 | 1.000 | 0.545 | 1.000 | 1.255 | 1.669 | -0.874 | -1.238 |
| D6 | -1.198 | 1.000 | 0.000 | 2.902 | 1.560 | 1.000 | 2.902 | 1.000 | 0.000 | 1.000 | 1.560 | 3.669 | -1.921 | -2.721 |
| R1 | 0.000 | 1.000 | 0.545 | -1.037 | -0.305 | 0.000 | -1.037 | 0.000 | 0.545 | 1.000 | -0.305 | 1.669 | 1.047 | 1.483 |

FIG.14D

Slip speeds of non-operated friction elements (relative to input element)

| Speed | C1 | C2 | B1 | B2 | B3 | B4 | SUM |
|---|---|---|---|---|---|---|---|
| D1 | 1.000 | 0.643 | 0.000 | 0.357 | 0.545 | 0.000 | 2.545 |
| D2 | 0.000 | 0.345 | 0.000 | 0.655 | 1.000 | 1.000 | 3.000 |
| D3 | 1.156 | 0.000 | 0.000 | 1.000 | 1.526 | 2.156 | 5.837 |
| D4 | 0.000 | 0.000 | 1.000 | 1.000 | 1.000 | 1.000 | 4.000 |
| D5 | 1.000 | 0.000 | 1.865 | 1.000 | 0.545 | 0.000 | 4.410 |
| D6 | 2.198 | 0.000 | 2.902 | 1.000 | 0.000 | 1.198 | 7.298 |
| R1 | 1.000 | 1.000 | 1.037 | 0.000 | 0.545 | 0.000 | 3.582 |
| SUM | 6.354 | 1.987 | 6.804 | 5.013 | 5.161 | 5.354 | 30.672 |

*FIG. 14E*

Torque load (relative to input element)

| Speed | T_S1 | T_PC1 | T_R1 | T_S2 | T_PC2 | T_R2 | T_S3 | T_PC3 | T_R3 | T_C1 | T_C2 | T_B1 | T_B2 | T_B3 | T_B4 |
|---|---|---|---|---|---|---|---|---|---|---|---|---|---|---|---|
| D1 | 0.835 | 1.000 | -1.835 | 1.167 | -3.967 | 2.799 | 0.965 | -2.799 | 1.835 | 0.000 | 0.000 | 2.132 | 0.000 | 0.000 | 0.835 |
| D2 | 0.455 | 0.545 | -1.000 | 0.636 | -2.162 | 1.526 | 0.526 | -1.526 | 1.000 | 0.000 | 0.000 | 1.162 | 0.000 | 0.000 | 0.000 |
| D3 | 0.000 | 0.000 | 0.000 | 0.417 | -1.417 | 1.000 | 0.000 | 0.000 | 0.000 | 0.455 | 1.000 | 0.417 | 0.000 | 0.000 | 0.000 |
| D4 | -0.255 | -0.305 | 0.560 | 0.294 | -1.000 | 0.706 | -0.294 | 0.854 | -0.560 | 0.000 | 1.560 | 0.000 | 0.000 | 0.000 | 0.000 |
| D5 | -0.203 | -0.243 | 0.446 | 0.235 | -0.797 | 0.562 | -0.235 | 0.681 | -0.446 | -0.255 | 1.243 | 0.000 | 0.000 | 0.000 | -0.203 |
| D6 | 0.000 | 0.000 | 0.000 | 0.189 | -0.641 | 0.452 | -0.189 | 0.548 | -0.359 | 0.000 | 1.000 | 0.000 | 0.000 | -0.359 | 0.000 |
| R1 | 0.835 | 1.000 | -1.835 | -0.965 | 3.278 | -2.313 | 0.965 | -2.799 | 1.835 | 0.000 | 0.000 | 0.000 | -5.113 | 0.000 | 0.835 |

FIG. 14F

Power transmission route

|     | PG1 | PG2 | PG3 | SUM |
|-----|-----|-----|-----|-----|
| D1  | 1   | 1   | 1   | 3   |
| D2  | 1   | 1   | 1   | 3   |
| D3  | 0   | 1   | 0   | 1   |
| D4  | 0   | 0   | 0   | 0   |
| D5  | 1   | 1   | 1   | 3   |
| D6  | 0   | 1   | 1   | 2   |
| R1  | 1   | 1   | 1   | 3   |
| SUM | 4   | 6   | 5   | 15  |

SIX-SPEED POWERTRAIN OF AN AUTOMATIC TRANSMISSION

CROSS-REFERENCE TO RELATED APPLICATION

This application claims priority to and the benefit of Korean Patent Application No. 10-2004-0069541 filed in the Korean Intellectual Property Office on Sep. 1, 2004, the entire content of which is incorporated herein by reference.

FIELD OF THE INVENTION

Generally, the present invention relates to an automatic transmission. More particularly, the present invention relates to a powertrain of an automatic transmission that realizes multiple shift speeds with a combination of a plurality of planetary gear sets.

BACKGROUND OF THE INVENTION

A typical shift mechanism of an automatic transmission utilizes a combination of a plurality of planetary gear sets. A powertrain of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a powertrain such as durability, efficiency in power transmission, and size depend a lot on the layout of combined planetary gear sets. Therefore, designs for a combining structure of a powertrain are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations basically without needing manual operation.

In addition to various developments regarding four and five speed powertrains, powertrains of automatic transmissions realizing six forward speeds and one reverse speed have recently been introduced, an example of which is found in U.S. Pat. No. 6,071,208 that was issued on Jun. 6, 2000.

FIG. 12 illustrates a powertrain of the patent U.S. Pat. No. 6,071,208, and FIG. 13 shows an operational chart for the powertrain.

Referring to FIG. 12, the powertrain of the patent U.S. Pat. No. 6,071,208 includes a double pinion planetary gear set PG1 and a pair of single pinion planetary gear sets PG2 and PG3. A first carrier 4 is fixedly connected to an input shaft 2, and a second carrier 22 always acts as an output element.

Regarding connections between operational elements, a first ring gear 6 and a third ring gear 8, a second sun gear 12 and a sun gear 10, and a second ring gear 16 and a third carrier 14 are fixedly interconnected, respectively. Meanwhile, the first carrier 4 is variably connected to a first sun gear 18 and the third carrier 14 interposing a first clutch C1 and a second clutch C2, respectively.

In addition, the powertrain further includes a first brake B1 that can stop rotation of the fixedly connected second and third sun gears 12 and 10, a second brake B2 that can stop rotation of the third carrier 14, a third brake B3 that can stop rotation of the first and third ring gears 6 and 8, and a fourth brake B4 that can stop the first sun gear 18.

As described above, the six-speed powertrain of U.S. Pat. No. 6,071,208 includes six friction elements of two clutches and four brakes. However, it is preferable to use fewer friction elements to enable six forward speeds and one reverse speed so that an automatic transmission can be more light and compact.

FIG. 13 is an operational chart for the powertrain of U.S. Pat. No. 6,071,208, and FIG. 14A-14F are charts showing operation states obtained when the powertrain is operated according to the operational chart in FIG. 13.

In particular, FIG. 14A shows detailed specifications of the powertrain of U.S. Pat. No. 6,071,208, i.e., gear ratios of each planetary gear set. FIG. 14B shows speed ratios in each shift-speed of the powertrain obtained by the detailed specification of FIG. 14A. In addition, FIG. 14C shows rotation speeds of each operational element relative to that of the input element, for each shift-speed. FIG. 14D shows slip speeds of friction elements at each shift-speed. FIG. 14E shows torque loads that each operational element or each friction element undertakes. FIG. 14F shows planetary gear sets that take part in power transmission in each shift-speed.

As shown in FIG. 13, the powertrain of U.S. Pat. No. 6,071,208 operates the first and fourth brakes B1 and B4 at a first speed, the first clutch C1 and the first brake B1 at a second speed, the second clutch C2 and the first brake B1 at a third speed, the first and second clutches C1 and C2 at a fourth speed, the second clutch C2 and the fourth brake B4 at a fifth speed, and the second clutch C2 and the third brake B3 at a sixth speed, respectively. The second and fourth brakes B2 and B4 are operated at a reverse speed.

Referring to the operational chart, the operation state of each operational element of the powertrain of U.S. Pat. No. 6,071,208 is described in detail. The planetary gear sets of the powertrain are supposed to have gear ratios shown in FIG. 14A such that the speed ratios shown in FIG. 14B are achieved.

(1) At the third forward speed, the first sun gear 18 rotates at a speed of more than twice that of the rotation speed of the input shaft (refer to FIG. 14C). In addition, the slip speed of the fourth brake B4, which is not operated in the third speed, becomes as high as that of the first sun gear 18 (refer to FIG. 14D).

The third forward speed is frequently engaged in the case that acceleration is needed, since a six-speed automatic transmission usually achieves the speed ratio of 1:1 at the fourth forward speed. Therefore, durability of an automatic transmission deteriorates if an element always rotates at a high speed in such a shift speed.

(2) Referring to FIG. 14D, slip speeds of friction elements are excessive for all speed ranges, which deteriorates durability of an automatic transmission and also causes excessive power loss. Therefore, the powertrain should be improved to have lesser slip speeds of friction elements for speeds D2-D6.

In particular, the sum of slip speeds of friction elements becomes excessively large at the sixth forward speed D6, and therefore, the durability problem is at its maximum at the sixth forward speed.

(3) Referring to FIG. 14F, when considering the number of planetary gear sets that take part in power transmission, at least two planetary gear sets take part in the power transmission for the fifth and sixth speeds, which deteriorates power efficiency. It is preferable that efficiency of power transmission is improved.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

As described above, a six-speed powertrain of the prior art has many factors to be improved. The present invention has been made in an effort to provide a six-speed powertrain having stability and durability by having a small number of frictional elements.

An exemplary six-speed powertrain of an automatic transmission according to an embodiment of the present invention includes: a first planetary gear set having operational elements of a first sun gear, a first ring gear, and a first carrier; a second planetary gear set having operational elements of a second sun gear, a second ring gear, and a second carrier; a third planetary gear set having operational elements of a third sun gear, a third ring gear, and a third carrier; an input shaft; at least one output gear; and a transmission case.

The first sun gear is fixedly connected to the second sun gear. The second carrier is fixedly connected to the third ring gear. The third sun gear always acts as an input element by being fixedly connected to the input shaft. At lease one operational element of the third carrier and the first ring gear always acts as an output element by being fixedly connected to the at least one output gear. At least one of the fixedly connected first and second sun gears is variably connected to the input shaft via a first clutch. The first carrier is variably connected to the input shaft via a second clutch. The first carrier is variably connected to the transmission case via a first brake and is subject to a stopping operation of the first brake. At lease one of the fixedly connected first and second sun gears is variably connected to the transmission case via a second brake and is subject to a stopping operation of the second brake. The second ring gear is variably connected to the transmission case via a third brake and is subject to a stopping operation of the third brake.

In a further embodiment, the at least one output gear includes first and second output gears, and the third carrier and the first ring gear is fixedly connected to the first and second output gears, respectively.

In a further embodiment, the exemplary six-speed powertrain according to an embodiment of the present invention further includes an output shaft arranged parallel with the input shaft, and the first and second output gears are engaged with the output shaft.

In a further embodiment, the first, second, and third planetary gearsets are disposed in a sequence of the third planetary gearset, the second planetary gearset, and the first planetary gearset.

In a further embodiment, the first and second clutches are disposed opposite of the second planetary gearset with respect to the first planetary gearset.

In a further embodiment, the second brake is disposed between the first and the second planetary gearsets.

In a wider scope, another exemplary six-speed powertrain of an automatic transmission according to the present invention includes: a first planetary gear set having first, second, and third operational elements that occupy sequential positions in a lever diagram; a second planetary gear set having fourth, fifth, and sixth operational elements that occupy sequential positions in a lever diagram; a third planetary gear set having seventh, eighth, and ninth operational elements that occupy sequential positions in a lever diagram; an input shaft; at least one output shaft; and a transmission case.

The third operational element is fixedly connected to the sixth operational element. The fifth operational element is fixedly connected to the ninth operational element. The seventh operational element always acts as an input element by being fixedly connected to the input shaft. At lease one operational element of the first and eighth operational elements always acts as an output element by being fixedly connected to the at least one output gear. At least one of the fixedly connected third and sixth operational elements is variably connected to the input shaft via a first clutch. The second operational element is variably connected to the input shaft via a second clutch. The second operational element is variably connected to the transmission case via a first brake and is subject to a stopping operation of the first brake. At least one of the fixedly connected third and sixth operational elements is variably connected to the transmission case via a second brake and is subject to a stopping operation of the second brake. The fourth operational element is variably connected to the transmission case via a third brake and is subject to a stopping operation of the third brake.

In a further embodiment, the at least one output gear includes first and second output gears, and the first and eighth operational elements are fixedly connected to the first and second output gears, respectively.

In a further embodiment, the exemplary six-speed powertrain according to an embodiment of the present invention further include an output shaft arranged parallel with the input shaft, and the first and second output gears are engaged with the output shaft.

In a further embodiment, the first, second, and third planetary gearsets are disposed in a sequence of the third planetary gearset, the second planetary gearset, and the first planetary gearset.

In a further embodiment, the first and second clutches are disposed opposite of the second planetary gearset with respect to the first planetary gearset.

In a further embodiment, the second brake is disposed between the first and the second planetary gearsets.

BRIEF DESCRIPTION OF THE DRAWINGS

The accompanying drawings illustrate exemplary embodiments of the present invention, and, together with the description, serve to explain the principles of the present invention, wherein:

FIG. 2 is an operational chart for a six-speed powertrain of an automatic transmission according to embodiments of the present invention;

FIGS. 11A-11F are charts showing operation states obtained when a six-speed powertrain of an automatic transmission according to embodiments of the present invention having specific gear ratios is operated;

FIGS. 14A-14F are charts showing operation states obtained when the powertrain shown in FIG. 12 is operated according to the operational chart in FIG. 13.

DETAILED DESCRIPTION OF THE EMBODIMENTS

An embodiment of the present invention will hereinafter be described in detail with reference to the accompanying drawings.

Figure 1:
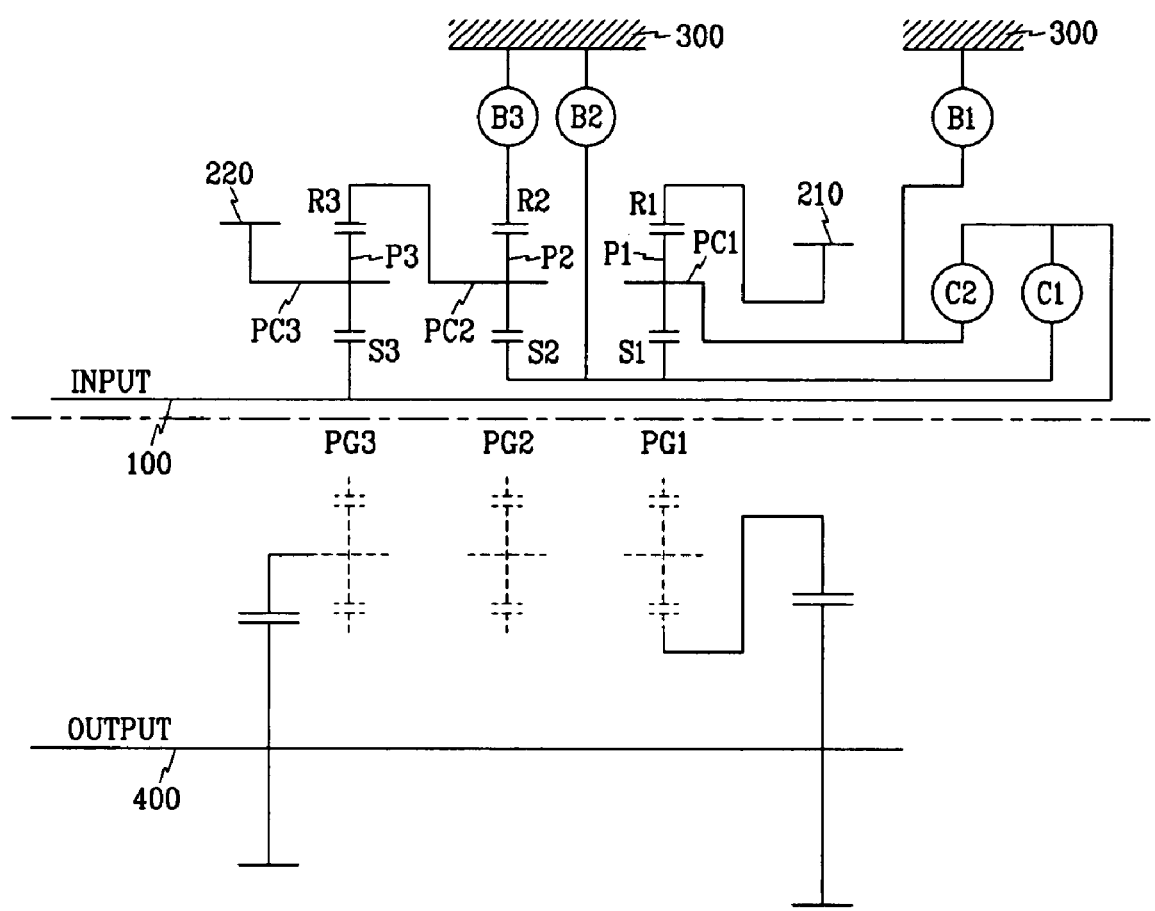
FIG. 1 illustrates a six-speed powertrain of an automatic transmission according to an embodiment of the present invention.

As shown in FIG. 1, a six-speed powertrain of an automatic transmission according to embodiments of the present invention includes three planetary gearsets of first, second, and third planetary gearsets PG1, PG2, and PG3.

The first planetary gearset PG1 is a single pinion planetary gearset, and includes a first sun gear S1, a first carrier PC1, and a first ring gear R1 as operational elements thereof. A first pinion gear P1, being engaged with both the first ring gear R1 and the first sun gear S1, is connected to and carried by the first carrier PC1.

The second planetary gearset PG2 is a single pinion planetary gearset, and includes a second sun gear S2, a second carrier PC2, and a second ring gear R2 as operational elements thereof. A second pinion gear P2, being engaged with both the second ring gear R2 and the second sun gear S2, is connected to and carried by the second carrier PC2.

The third planetary gearset PG3 is a single pinion planetary gearset, and includes a third sun gear S3, a third carrier PC3, and a third ring gear R3 as operational elements thereof. A third pinion gear P3, being engaged with both the third ring gear R3 and the third sun gear S3, is connected to and carried by the third carrier PC3.

In addition, as shown in FIG. 1, a six-speed powertrain of an automatic transmission according to embodiments of the present invention further includes an input shaft 100 for receiving torque from an engine (not shown), output gears 210 and 220 for outputting torque from the powertrain, and a transmission case 300.

The first sun gear S1 is fixedly connected to the second sun gear S2.

The second carrier PC2 is fixedly connected to the third ring gear R3.

The third sun gear S3 always acts as an input element by being fixedly connected to the input shaft 100.

The first ring gear R1 always acts as an output element by being fixedly connected to the first output gear 210.

The third carrier PC3 always acts as an output element by being fixedly connected to the second output gear 220.

The fixedly connected first and second sun gears S1 and S2 are variably connected to the input shaft 100 via a first clutch C1.

The first carrier PC1 is variably connected to the input shaft 100 via a second clutch C2.

The first carrier PC1 is variably connected to the transmission case 300 via a first brake B1 and is subject to a stopping operation of the first brake B1.

The fixedly connected first and second sun gears S1 and S2 is variably connected to the transmission case 300 via a second brake B2 and is subject to a stopping operation of the second brake B2.

The second ring gear R2 is variably connected to the transmission case 300 via a third brake B3 and is subject to a stopping operation of the third brake B3.

A six-speed powertrain according to an embodiment of the present invention further includes an output shaft 400 arranged parallel with the input shaft 100, and the first and second output gears 210 and 220 are engaged with the output shaft 400.

Therefore, torque that passes through the first, second, and third planetary gearsets PG1, PG2, and PG3 is output through the two routes of the first and second output gears 210 and 220.

As shown in FIG. 1, according to a powertrain of an automatic transmission of an embodiment of the present invention, the first, second, and third planetary gearsets PG1, PG2, and PG3 are disposed in a sequence of the third planetary gearset PG3, the second planetary gearset PG2, and the first planetary gearset PG1.

The first and second clutches C1 and C2 are disposed opposite of the second planetary gearset PG2 with respect to the first planetary gearset PG1.

In addition, the second brake B2 is disposed between the first and the second planetary gearsets PG1 and PG2.

Hereinafter, an operation of a six-speed powertrain of an automatic transmission according to an embodiment of the present invention is described in detail.

As shown in FIG. 2, a six-speed powertrain of an automatic transmission according to an embodiment of the present invention operates: the first brake B1 and the third brake B3 at a first forward speed D1; the second brake B2 and the third brake B3 at a second forward speed D2; the first clutch C1 and the third brake B3 at a third forward speed D3; the second clutch C2 and the third brake B3 at a fourth forward speed D4; the first clutch C1 and the second clutch C2 at a fifth forward speed D5; and the second clutch C2 and the second brake B2 at a sixth forward speed D6.

The first clutch C1 and the first brake B1 are operated at a reverse speed R.

Shift ratios shown in FIG. 2 are calculated (or scaled) with respect to the first ring gear R1 among the two output element of the first ring gear R1 and the third carrier PC3.

Specific values of shift ratios shown in FIG. 2 are obtained in the case that first, second, and third planetary gearsets PG1, PG2, and PG3 have ring gear/sun gear tooth ratios as shown in FIG. 11A and output speed of the third carrier PC3 is 0.824 times of an output speed of the ring gear R1.

When the ring gear/sun gear tooth ratio of the first, second, and third planetary gearsets PG1, PG2, and PG3 differ from FIG. 11A, values of shift ratios for the different ring gear/sun gear tooth ratios may be obviously calculated by a person of ordinary skill in the art from the detailed description of the present invention.

Figure 3:
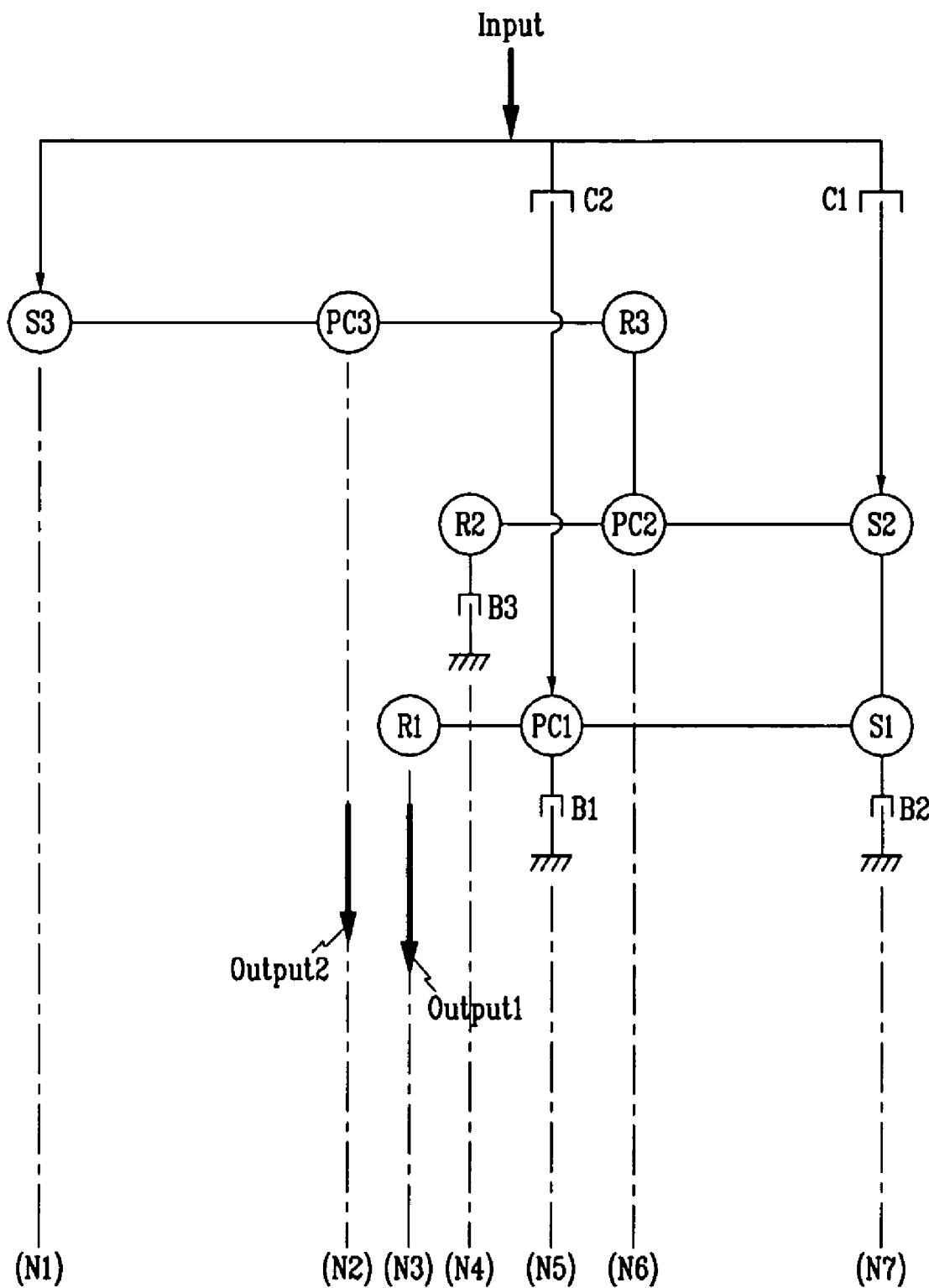
FIG. 3 is a lever diagram illustrating operational nodes (N1 through N7) of a six-speed powertrain of an automatic transmission according to embodiments of the present invention.

FIG. 3 is a lever diagram illustrating operational nodes (N1 through N7) of a six-speed powertrain of an automatic transmission according to embodiments of the present invention.

As shown in FIG. 3, the first ring gear R1, the first carrier PC1, and the first sun gear S1 of the first planetary gearset PG1 are sequentially located at operational nodes N3, N5, and N7 in the lever diagram.

The second ring gear R2, the second carrier PC2, and the second sun gear S2 of the second planetary gearset PG2 are sequentially located at operational nodes N4, N6, and N7 in the lever diagram.

The third sun gear S3, the third carrier PC3, and the third ring gear R3 of the third planetary gearset PG3 are sequentially located at operational nodes N1, N2, and N6 in the lever diagram.

As described above, the input shaft 100 is variably connected to the first and second sun gears S1 and S2 via the first clutch C1. Therefore, engine rotation input through the input shaft 100 is delivered to the seventh node N7 or the fifth node N5 according to an operation of the first and second clutches C1 and C2.

The first carrier PC1 is variably connected to the transmission case 300 via the first brake B1. Therefore, the fourth node N4 of the first carrier PC1 may be stopped by an operation of the first brake B1.

In addition, the fixedly connected first and second sun gears S1 and S2 are variably connected to the transmission case 300 via the second brake B2. Therefore, the seventh node N7 may be stopped by an operation of the second brake B2.

In addition, the second ring gear R2 is variably connected to the transmission case 300 via the third brake B3. Therefore, the fourth node N4 of the second ring gear R2 may be stopped by an operation of the third brake B3.

Hereinafter, formation of each speed by a six-speed powertrain of an automatic transmission according to an embodiment of the present invention is described in detail with reference to FIGS. 4-10.

Throughout FIG. 4 through FIG. 10, L1 denotes a speed line for the first planetary gearset PG1, L2 denotes a speed line for the second planetary gearset PG2, and L3 denotes a speed line for the third planetary gearset PG3.

The speed line L1 of the first planetary gearset PG1 and the speed line L2 of the second planetary gearset PG2 meet at the seventh node N7 since the first sun gear S1 and the second sun gear S2 are fixedly interconnected.

The speed line L2 of the second planetary gearset PG2 and the speed line L3 of the third planetary gearset PG3 meet at the sixth node N6 since the second carrier PC2 and the third ring gear R3 are fixedly interconnected.

The third sun gear S3 always rotates at an input speed since it is fixedly connected to the input shaft.

Arrangement of the speed lines L1, L2, and L3 of the first, second, and third planetary gearsets PG1, PG2, and PG3 are determined by selective operation of the first and second clutches C1 and C2 and the first, second, and third brakes B1, B2 and B3 under such a condition.

Figure 4:
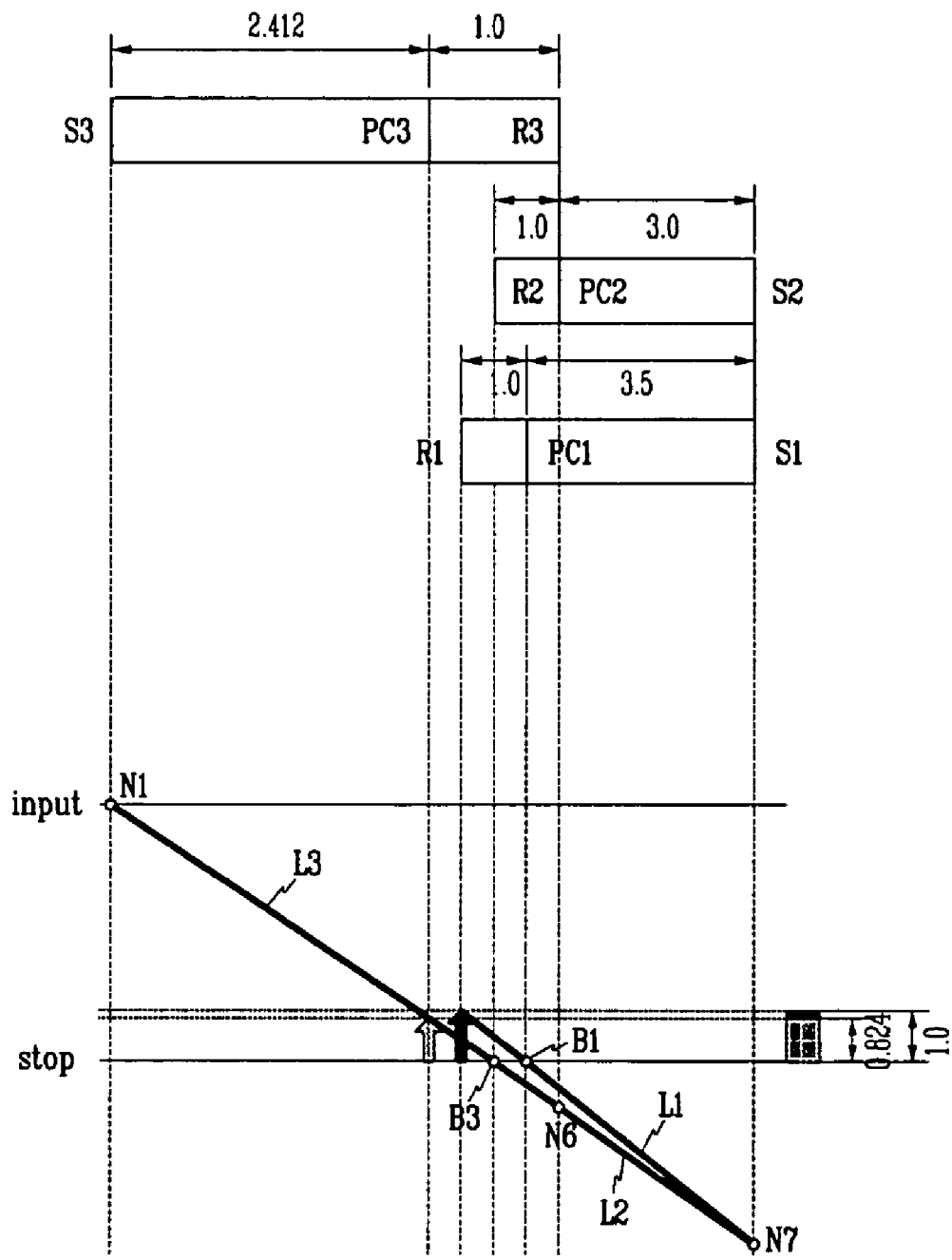
FIG. 4 illustrates a speed diagram for a first forward speed of a six-speed powertrain of an automatic transmission according to embodiments of the present invention.

At the first forward speed D1, as shown in FIG. 4, the second ring gear R2 on the fourth node N4 becomes stationary since the third brake B3 operates. In addition, the fifth node N5 is stationary since the first brake B1 operates.

Therefore in this case, the speed lines L1, L2, and L3 are formed as shown in FIG. 4.

That is, regarding the fourth, sixth, and seventh nodes N4, N6, and N7 of the second planetary gearset PG2, the fourth node N4 is stationary, and the sixth and seventh nodes N6 and N7 rotates at a negative speed.

Regarding the third, fifth, and seventh nodes N3, N5, and N7 of the first planetary gearset PG1, the speed line L1 is found by as line connecting the seventh node N7 that is rotating at a negative speed and the fifth node N5 that is stationary. Therefore, the first ring gear R1 that is an output element on the third node N3 rotates at a low positive speed.

Therefore, the speed line L3 of the third planetary gearset PG3 is formed to be declining rightward as shown in FIG. 4. In this case, the third carrier PC3 that is an output element on the second node N2 rotates at a very low speed relatively to a rotation of the input shaft 100.

At such a first forward speed, all of the first, second, and third planetary gear sets PG1, PG2, and PG3 take part in the power transmission.

Figure 5:
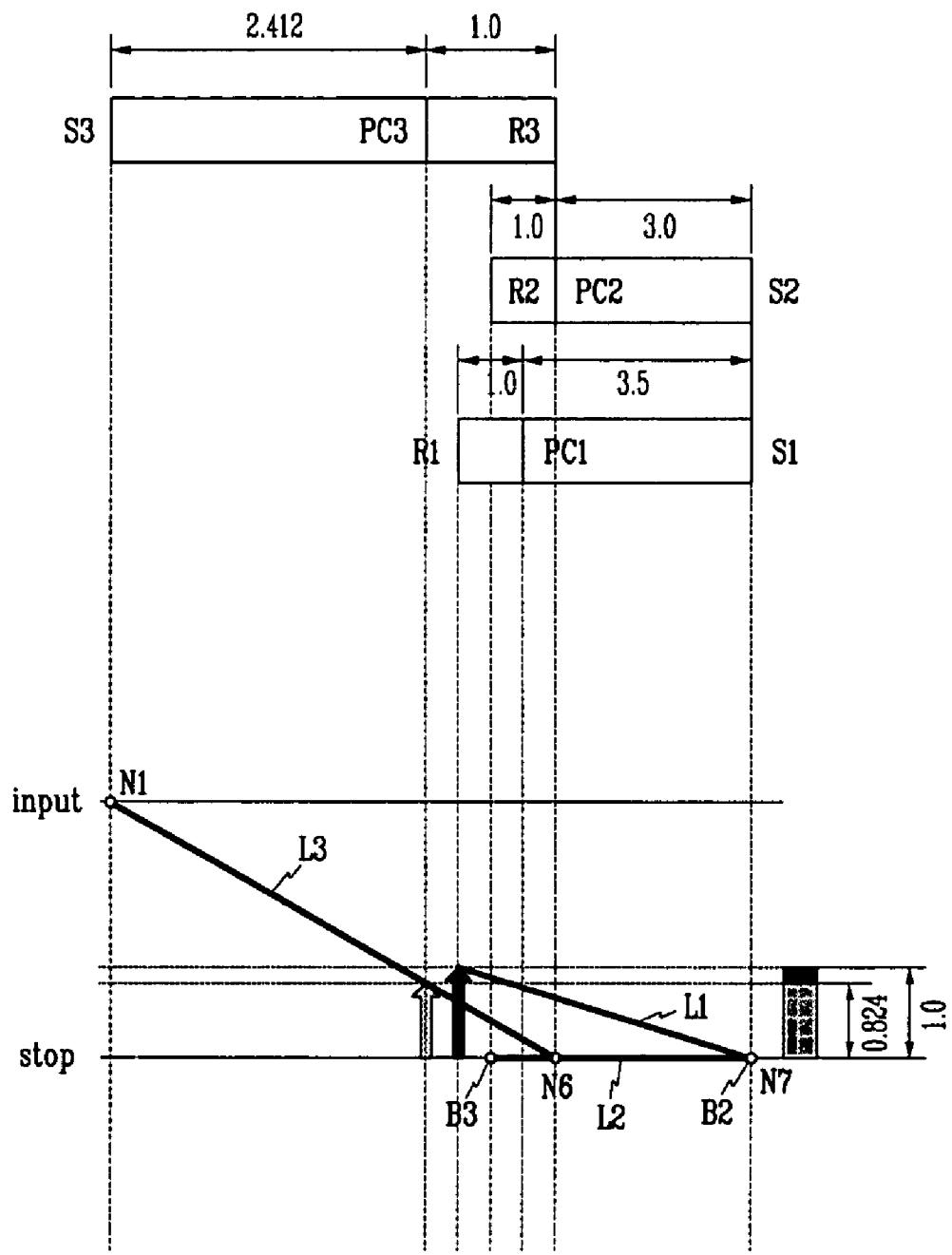
FIG. 5 illustrates a speed diagram for a second forward speed of a six-speed powertrain of an automatic transmission according to embodiments of the present invention.

At the second forward speed D2, as shown in FIG. 5, the second ring gear R2 on the fourth node N4 remains stationary since the third brake B3 also operates in the second forward speed. In addition, the seventh node N7 is stationary since the second brake B2 operates.

Therefore in this case, speed line L2 of the second planetary gearset PG2 becomes horizontal at zero speed since both the fourth and seventh nodes N4 and N7 are stationary. This implies that the sixth node N6 should also be stationary.

Therefore, a speed line L3 of the third planetary gearset PG3 becomes slightly rotated counterclockwise, in comparison with the first forward speed. Therefore, the third carrier PC3 that is an output element rotates at an increased speed in comparison with the first forward speed.

At the second forward speed, the rotation speed of the first ring gear R1 is proportional to the rotation speed of the third carrier PC3. That is, the rotation speed of the first ring gear R1 at the second speed is $1/0.824$ times of the rotation speed of the third carrier PC3

At such a second forward speed, the third planetary gearset PG3 takes part in the power transmission since the second planetary gearset PG2 is stationary.

Figure 6:
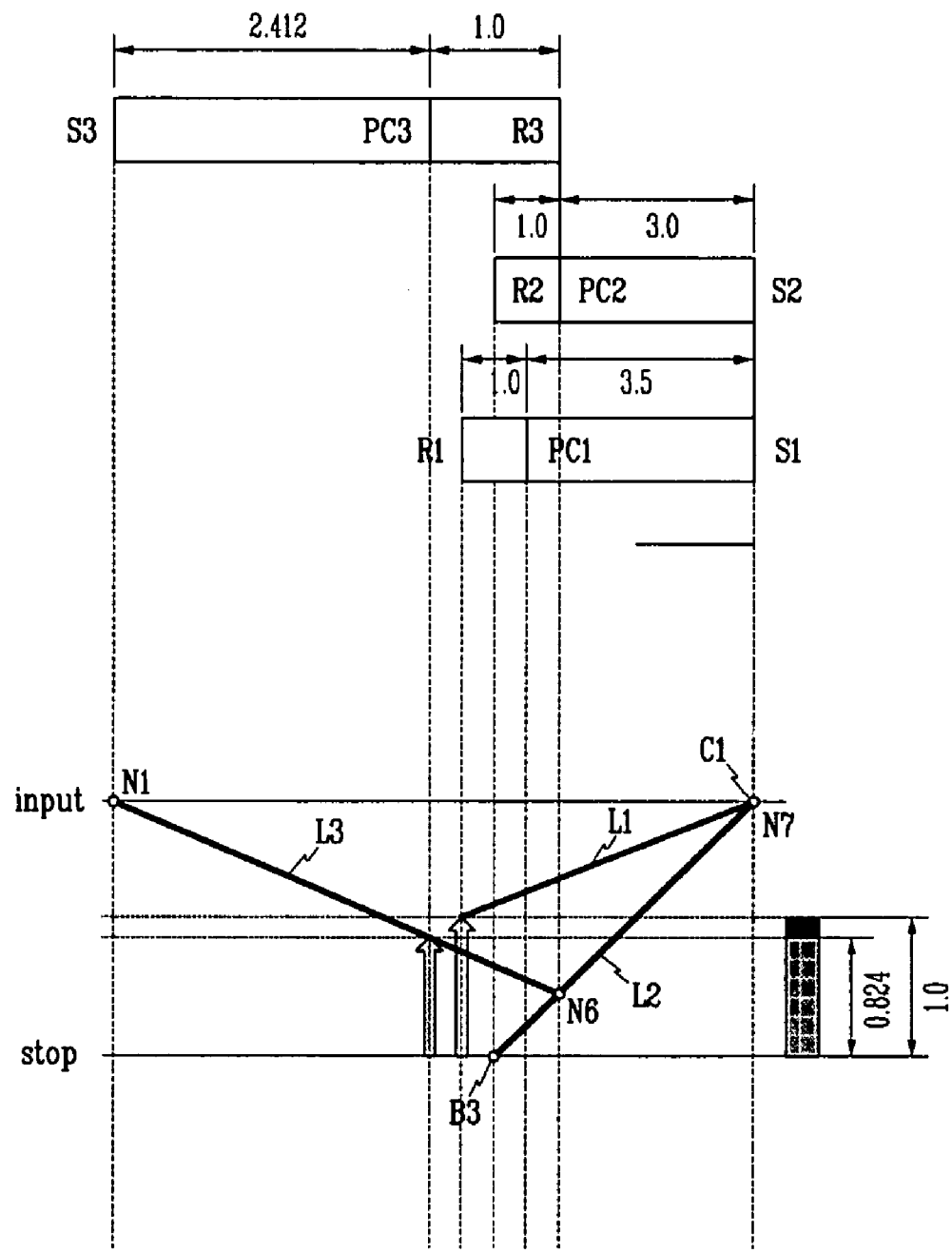
FIG. 6 illustrates a speed diagram for a third forward speed of a six-speed powertrain of an automatic transmission according to embodiments of the present invention.

At the third forward speed D3, as shown in FIG. 6, the second ring gear R2 on the fourth node N4 remains stationary since the third brake B3 also operates in the third forward speed. In addition, the seventh node N7 also rotates at the same speed as the input shaft 100 since the first clutch C1 operates.

Therefore in this case, the speed line L2 of the second planetary gearset PG2 is formed by the fourth node N4 that is stationary and the seventh node N7 rotating at the input speed. The drive line L3 of the third planetary gearset PG3 is determined by the sixth node N6 on the speed line L2 of the second planetary gearset PG2.

Therefore, the speed line L3 of the third planetary gearset PG3 becomes slightly rotated counterclockwise, in comparison with the second forward speed. Therefore, the third carrier PC3 that is an output element rotates at an increased speed in comparison with the second forward speed.

At the second speed, the rotation speed of the first ring gear R1 is $1/0.824$ times of the rotation speed of the third carrier PC3.

At such a third forward speed, the second and third planetary gearsets PG2 and PG3 take part in the power transmission.

Figure 7:
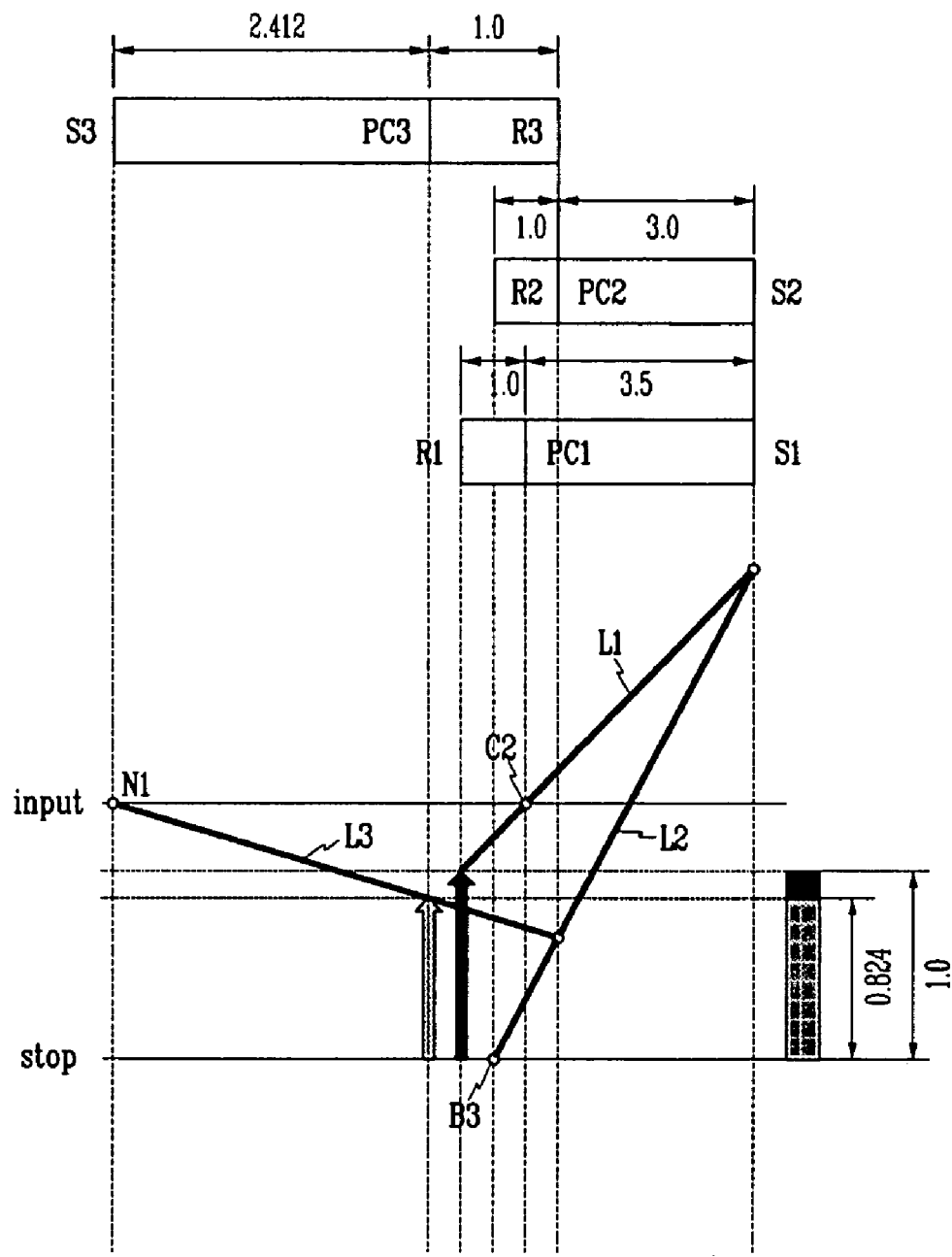
FIG. 7 illustrates a speed diagram for a fourth forward speed of a six-speed powertrain of an automatic transmission according to embodiments of the present invention.

At the fourth forward speed D4, as shown in FIG. 7, the second ring gear R2 on the fourth node N4 remains stationary since the third brake B3 also operates in the fourth forward speed. In addition, the fifth node N5 also rotates at the same speed as the input shaft 100 since the second clutch C2 operates.

Therefore in this case, the speed lines L1, L2, and L3 are formed as shown in FIG. 7.

That is, the speed line L2 of the second planetary gearset PG2 becomes slightly rotated counterclockwise, in comparison with the third forward speed.

In the same way, the speed line L3 of the third planetary gearset PG3 becomes slightly rotated counterclockwise, in comparison with the third forward speed. Therefore, the third carrier PC3 and the first ring gear R1 that are an output element rotates at an increased speed in comparison with the third forward speed.

At such a fourth forward speed, all of the first, second, and third planetary gear sets PG1, PG2, and PG3 take part in the power transmission.

Figure 8:
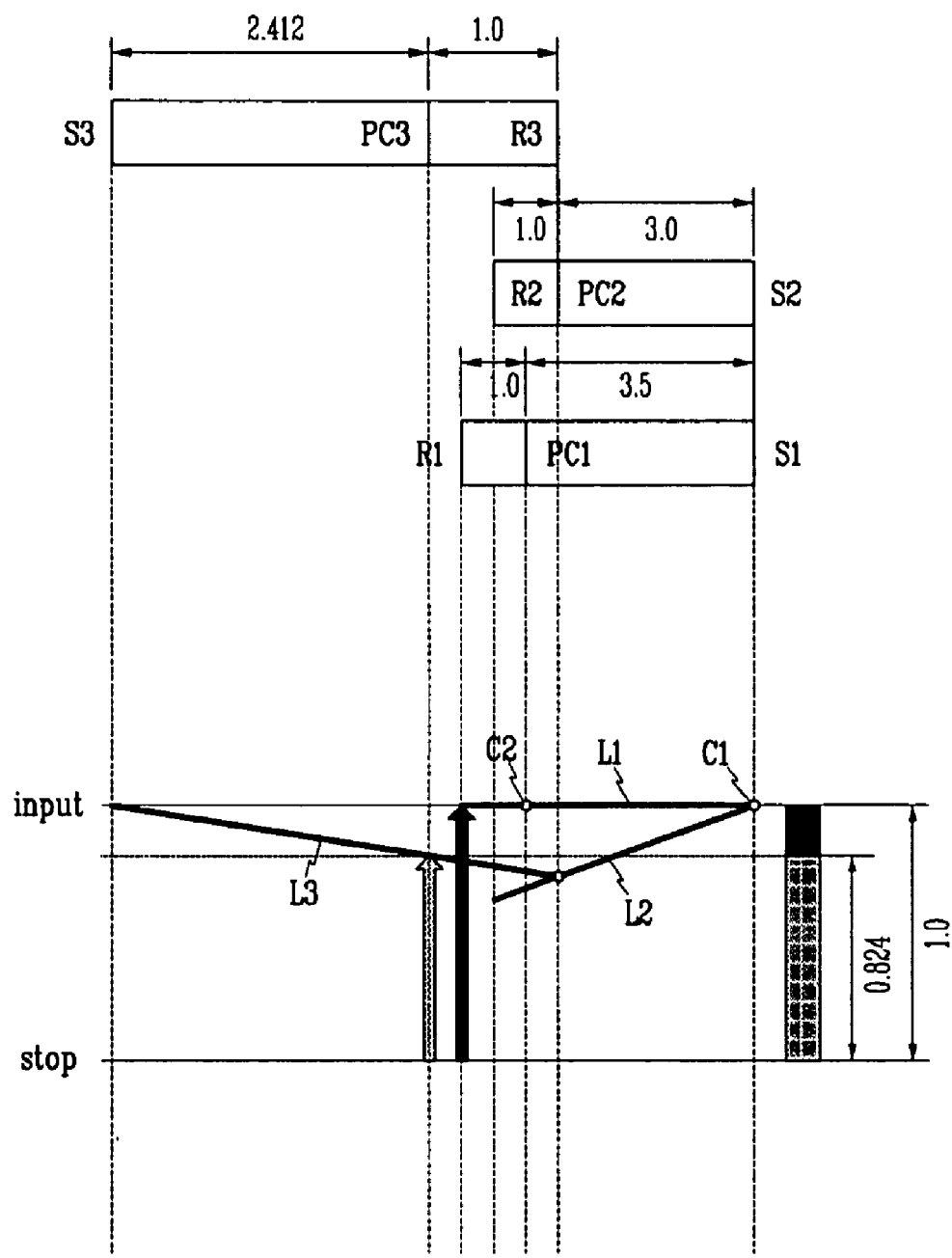
FIG. 8 illustrates a speed diagram for a fifth forward speed of a six-speed powertrain of an automatic transmission according to embodiments of the present invention.

At the fifth forward speed D5, the first and second clutches C1 and C2 operate. Therefore, as shown in FIG. 8, the fifth and seventh nodes N5 and N7 rotate at the same speed as the input shaft 100.

Therefore, the speed line L1 of the first planetary gearset PG1 becomes horizontal at a height of rotation speed of the input shaft 100. This implies that the first planetary gearset rotates as a whole.

Therefore, the third node N3 also rotates at the input speed, and accordingly, the input speed is directly output through the first ring gear R1 without changing.

At the fifth speed, the rotation speed of the third carrier PC3 is 0.824 times of the rotation speed of the first ring gear R1.

At such a fifth forward speed, none of the first, second, and third planetary gear sets PG1, PG2, and PG3 takes part in the power transmission. That is, the first planetary gearset PG1 rotates as a whole, and directly transmits the input speed without changing.

Figure 9:
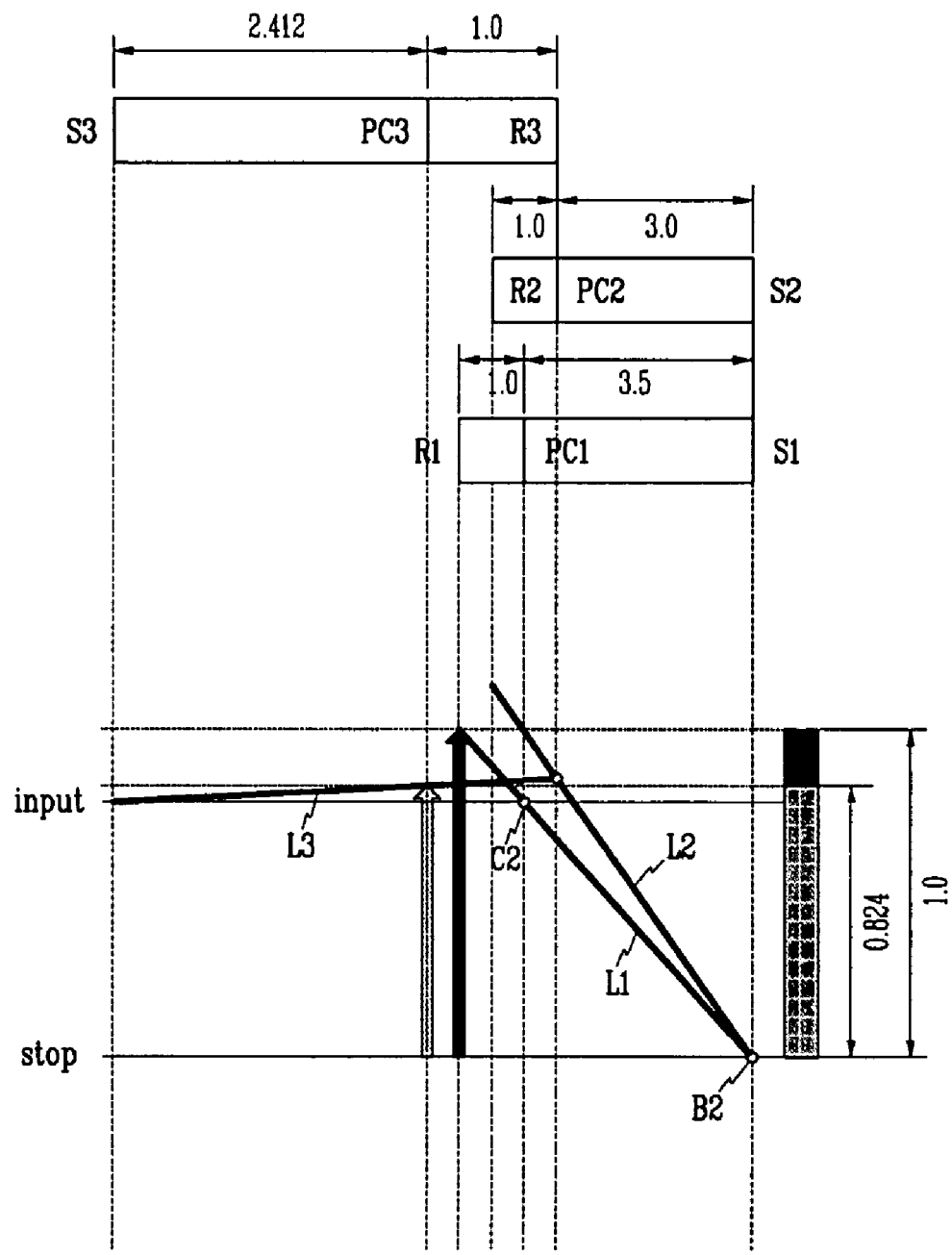
FIG. 9 illustrates a speed diagram for a sixth forward speed of a six-speed powertrain of an automatic transmission according to embodiments of the present invention.

At the sixth forward speed D6, as shown in FIG. 9, the fifth node N5 rotates at the same speed as the input shaft 100 since the second clutch C2 operates. In addition, the seventh node N7 becomes stationary since the second brake B2 operates.

Therefore, the speed line L1 of the first planetary gearset PG1 is formed by the seventh node N7 that is stationary and the fifth node N5 rotating at the input speed.

Therefore, the third node N3 on the speed line L1 of the first planetary gearset PG1 rotates at a speed higher than the input speed. This implies that rotation speed output from the first ring gear R1 is higher than the input speed.

At such a sixth forward speed, only the first planetary gearset PG1 takes part in the power transmission.

At the reverse speed R, the first clutch C1 and the first brake B1 operates. Therefore, as shown in FIG. 10, the speed line L1 of the first planetary gearset PG1 is formed by the fifth node N5 that is stationary and the seventh node N7 rotating at the input speed.

Figure 10:
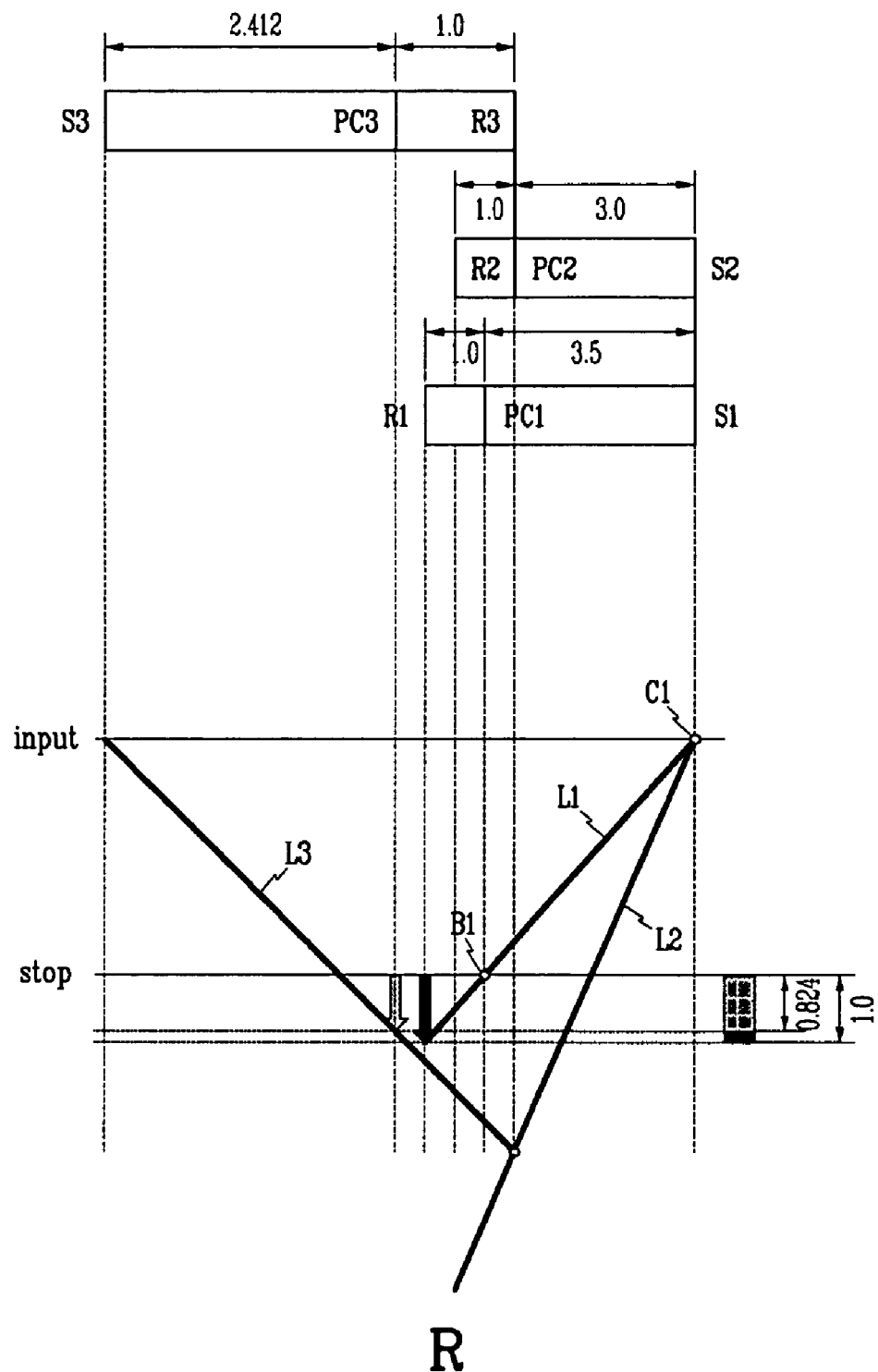
FIG. 10 illustrates a speed diagram for a reverse speed of a six-speed powertrain of an automatic transmission according to embodiments of the present invention.
Figures 12, 13:
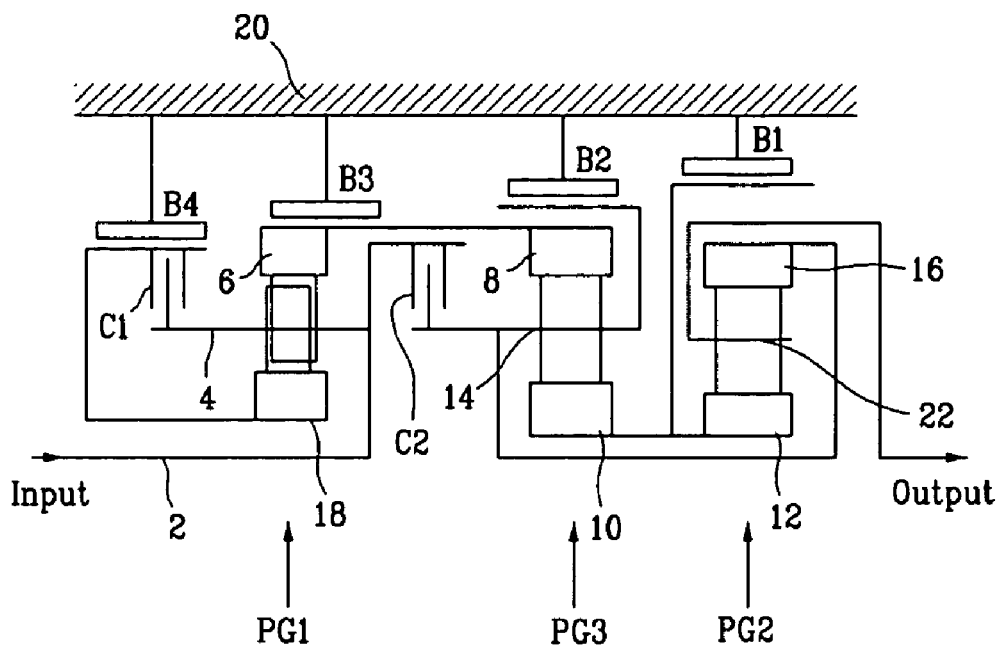
FIG. 12 illustrates an exemplary six-speed powertrain according to the prior art.
FIG. 13 is an operational chart for the powertrain shown in FIG. 12.

Therefore, the third node N3 on the speed line L1 of the first planetary gearset PG1 rotates at a negative speed, i.e., rotates reversely, as shown in FIG. 10.

At such a reverse speed, only the first planetary gearset PG1 takes part in the power transmission.

FIGS. 11A-11F are charts showing operation states of a power train of an automatic transmission according to a preferred embodiment of the present invention.

In particular, FIG. 11A shows detailed specifications of the powertrain according to one embodiment, i.e., gear ratios of each planetary gear set. FIG. 14B shows speed ratios in each shift-speed of the powertrain of such an embodiment obtained by the detailed specification of FIG. 11A. FIG. 11C shows rotation speeds of each operational element relative to that of the input element, for each shift-speed. FIG. 11D shows slip speeds of friction elements at each shift-speed. FIG. 11E shows torque loads that each operational element or each friction element undertakes. FIG. 11F shows planetary gear sets that take part in power transmission in each shift-speed.

Details shown in FIG. 11F are apparent from the above description of shifting operation of the powertrain of the present invention, and the numbers shown in FIGS. 11C-11E may be calculated by a person skilled in the art based on the structural features and operational chart of the powertrain of the present embodiment.

As is well known in the art, under hard acceleration, high load is input to an automatic transmission. According to powertrains of a preferred embodiment, no operational element rotates faster than the input speed at the second and third speeds that is frequently engaged for acceleration (refer to FIG. 11C), and therefore, slip speeds of friction elements not operated at the third speed are less than the rotation speed of the input shaft (refer to FIG. 11D).

When the performance shown in FIG. 11D is compared with performance of a prior art powertrain shown in FIG. 14D, it is apparent that the powertrains of the present embodiments show less slip speeds of friction elements overall at the second to sixth speeds (especially at sixth forward speed) than the powertrain of, for example, U.S. Pat. No. 6,071,208.

Also, it is well known that more planetary gear sets implies more loss of power during power transmission. When the performance shown in FIG. 11F is compared with performance of the prior art powertrain shown in FIG. 14F, it is apparent that the powertrain of a preferred embodiment has less planetary gear sets involved in the power transmission at many of the shift-speeds, and accordingly it shows better power efficiency.

In addition, torque load is dispersed to all operating elements of a planetary gearset, and accordingly the powertrain may endure higher load.

According to a preferred embodiment of the present invention, six forward speeds and one reverse speed are achieved with a minimized number of friction elements such that an automatic transmission becomes light and compact.

Durability is increased due to reduction of rotation speeds of operational elements at a shift-speed frequently engaged for acceleration. A further increase of durability and reduction of power loss is also achieved by reduction of slip speeds of friction elements.

A shortened route of power transmission also contributes to an increase of durability and reduction of power loss.

A shortened route of power transmission also contributes to an increase of durability and reduction of power loss.

In addition, torque is delivered to the output shaft through two routes, and accordingly, torque load may be dispersed to plural elements. Therefore, torque load of each operating element may be reduced, and accordingly, the powertrain may endure higher load.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A six-speed powertrain of an automatic transmission, comprising:
a first planetary gear set having operational elements of a first sun gear, a first ring gear, and a first carrier;
a second planetary gear set having operational elements of a second sun gear, a second ring gear, and a second carrier;
a third planetary gear set having operational elements of a third sun gear, a third ring gear, and a third carrier;
an input shaft;
at least one output gear; and
a transmission case,
wherein:
the first sun gear is fixedly connected to the second sun gear;
the second carrier is fixedly connected to the third ring gear;
the third sun gear always acts as an input element by being fixedly connected to the input shaft;
at least one element of the third carrier and the first ring gear always acts as an output element by being fixedly connected to the at least one output gear;
at least one of the fixedly connected first and second sun gears is variably connected to the input shaft via a first clutch;
the first carrier is variably connected to the input shaft via a second clutch;
the first carrier is variably connected to the transmission case via a first brake and is subject to a stopping operation of the first brake;
at least one of the first and second sun gears is variably connected to the transmission case via a second brake and is subject to a stopping operation of the second brake; and
the second ring gear is variably connected to the transmission case via a third brake and is subject to a stopping operation of the third brake.

2. The powertrain of claim 1, wherein:
the at least one output gear comprises first and second output gears; and
the third carrier and the first ring gear are fixedly connected to the first and second output gears, respectively.

3. The powertrain of claim 2, further comprising an output shaft arranged parallel with the input shaft, wherein the first and second output gears are engaged with the output shaft.

4. The powertrain of claim 1, wherein the first, second, and third planetary gearsets are disposed in a sequence of the third planetary gearset, the second planetary gearset, and the first planetary gearset.

5. The powertrain of claim 4, wherein the first and second clutches are disposed opposite of the second planetary gearset with respect to the first planetary gearset.

6. The powertrain of claim 4, wherein the second brake is disposed between the first and the second planetary gearsets.

* * * * *